UNITED STATES PATENT OFFICE.

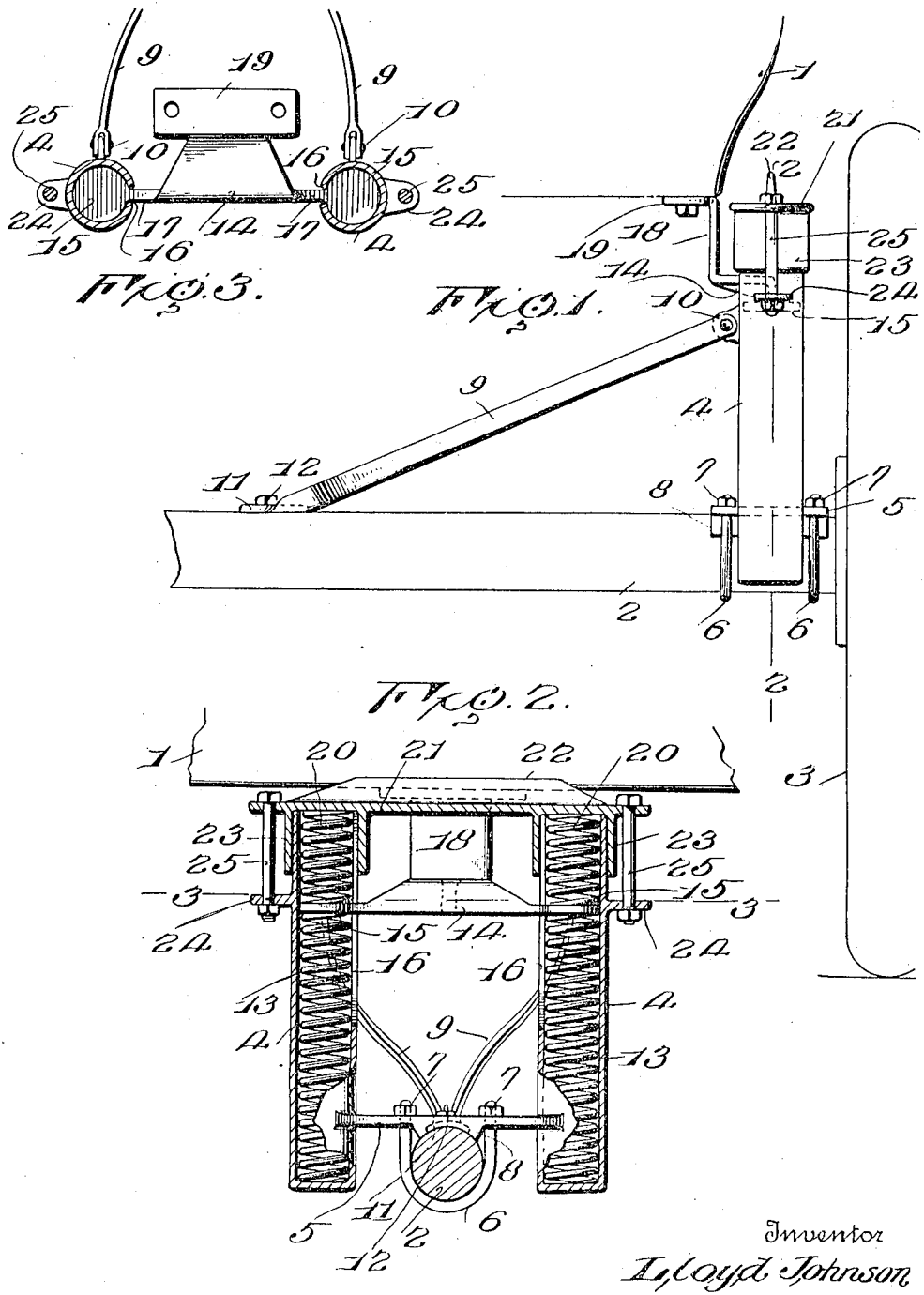

LLOYD JOHNSON, OF UHRICHSVILLE, OHIO.

VEHICLE-SPRING.

1,286,016.  Specification of Letters Patent.  Patented Nov. 26, 1918.

Application filed May 15, 1918. Serial No. 234,745.

*To all whom it may concern:*

Be it known that I, LLOYD JOHNSON, a citizen of the United States, residing at Uhrichsville, in the county of Tuscarawas and State of Ohio, have invented certain new and useful Improvements in Vehicle-Springs, of which the following is a specification.

My invention relates to vehicle springs and has for its object the provision of a mechanism which may be produced at a low cost and readily applied to a vehicle so as to prevent excessive vibration of the vehicle body when traveling over rough roads and thereby promote the comfort of the occupants of the vehicle.

The invention seeks to provide a device for the stated purpose which will be strong and durable and in which the resilient members will be protected against injury so that breaking of the same will not be apt to occur.

The invention is illustrated in the accompanying drawings, in which—

Figure 1 is a view in elevation showing my improved spring in connection with a portion of a vehicle body and a portion of the axle and ground wheel;

Fig. 2 is a vertical section on the line 2—2 of Fig. 1;

Fig. 3 is a view, partly in horizontal section on the line 3—3 of Fig. 2 and partly in plan.

In the drawings, the reference numeral 1 indicates a vehicle body, 2 the vehicle axle, and 3 one of the ground wheels which is mounted on the axle and supports the vehicle. These parts may be of any well-known or preferred construction and are illustrated in a more or less conventional manner as their specific construction forms no part of my present invention.

Arranged vertically at the opposite sides of the axle are cylindrical casings 4 which are connected near their lower ends by a brace bar 5 adapted to rest upon the axle and having suitable openings formed therethrough to receive the ends of a clip or U-shaped bolt 6 passing beneath and up at the sides of the axle, the extremities of said clip or bolt being fitted with nuts 7 adapted to be turned home against the brace bar 5 so as to secure the casings firmly upon the axle. To obtain a more extended bearing for the brace bar upon the axle, a projection 8 is formed on the under side of the bar having a concave seat, as shown clearly in Fig. 2, so as to fit firmly and closely upon the axle and obtain the required bearing thereon. The bar is preferably enlarged laterally so as to project beyond the sides of the casings, as shown in Fig. 1, so that a pair of the clips or U-shaped securing bolts may be employed. To the casings, near the upper ends thereof, I secure a brace bar 9 which is preferably bowed, as shown in the drawings, and may have its upper spaced ends pivotally attached to the casings, as indicated at 10. The lower end of this brace is provided with a perforated lug or base 11 through which a suitable securing bolt or screw 12 may be inserted to firmly secure the brace to the axle. By pivoting the upper end of the brace to the casings, I am enabled to readily adjust the device to irregularities in the shape of the axle so that it will not be necessary to provide separate braces for different types of axles.

Within the casings 4, I house coiled springs 13 which rest upon the bottoms or lower ends of the casings and support at their upper ends a platform 14 having its ends of proper configuration to fit neatly but slidably within the casings, as indicated at 15. In the opposed sides of the casings, I form the vertical slots 16 through which the necks 17 of the platform extend, the body portion of the platform being disposed between the casings and connected with the expanded end portions 15 by said necks as will be readily understood and as shown in Fig. 3. The platform is extended inwardly from the casings and at its inner edge supports a standard 18, at the upper end of which is a rest 19 which is secured firmly to the under side of the vehicle body. Springs 20 are housed within the cylindrical casings 4 above the ends 15 of the platform and upon the upper ends of the casings is fitted a cap plate 21 reinforced by a longitudinal rib 22 on its upper side and having thimbles 23 depending from its under side near its ends to engage over the ends of the casings and thereby aid in centering the cap plate thereon and also preventing spreading of the upper ends of the casings. Below their upper ends, the casings are constructed with perforated lugs or ears 24 and securing bolts 25 are inserted through the said lugs or ears and the ends of the cap plate, as clearly shown, to secure the cap plate firmly in position upon the casings. It will be readily noted from the foregoing description taken in connection with the accompanying drawings that I have provided an exceedingly simple device which will yield readily to any roughness in the surface of a road bed, but at the same time will firmly support a vehicle body so that it will not rest directly on the axles. Vertical movement of the vehicle body or of the axle relative to the body will be cushioned at both the upper and lower ends of the permitted stroke so that there will be no abrupt stoppage of the vertical movement and consequently there will not be any shocks imparted to the occupants of the vehicle. The casings positively protect the springs against flying stones or other accidents or other sources of injury and consequently positively prevent breaking thereof from extraneous causes and they are secured upon the axle in such manner that they will be positively and rigidly held in a vertical position so that the body will be supported properly and binding of the springs in use will be avoided.

Having thus described the invention, what is claimed as new is:

1. In combination with a vehicle axle, and a vehicle body, a clamp secured around the axle, casings disposed at opposite sides of the axle and carried by said clamp, a brace bar secured at its upper end to the casings and at its lower end to the axle, springs housed within the casings, and a platform supported by said springs and movable vertically in the casings and adapted to be secured to the vehicle body.

2. A device for the purpose set forth comprising a pair of tubular casings, a clamping bar rigid with the casings near the lower ends thereof and extending between the same, a coacting member adapted to secure said clamping bar to a vehicle axle, a forked brace bar having its upper ends secured to the casings near the upper ends thereof and its lower end adapted to be secured to the vehicle axle, a platform having enlarged ends fitting within the casings and reduced necks extending from said ends through slots in the sides of the casings, a standard rising from the platform to be secured to a vehicle body, a cap plate extending over the upper ends of the casings and provided near its ends with depending thimbles fitting over the casings, means for securing said cap plate on the casings, and springs housed within the casings above and below the ends of the platform.

In testimony whereof I affix my signature.

LLOYD JOHNSON. [L. S.]

Copies of this patent may be obtained for five cents each, by addressing the "Commissioner of Patents, Washington, D. C."